Dec. 25, 1945.     I. J. SNADER     2,391,487
MACHINE TOOL
Filed Feb. 26, 1937     6 Sheets-Sheet 1
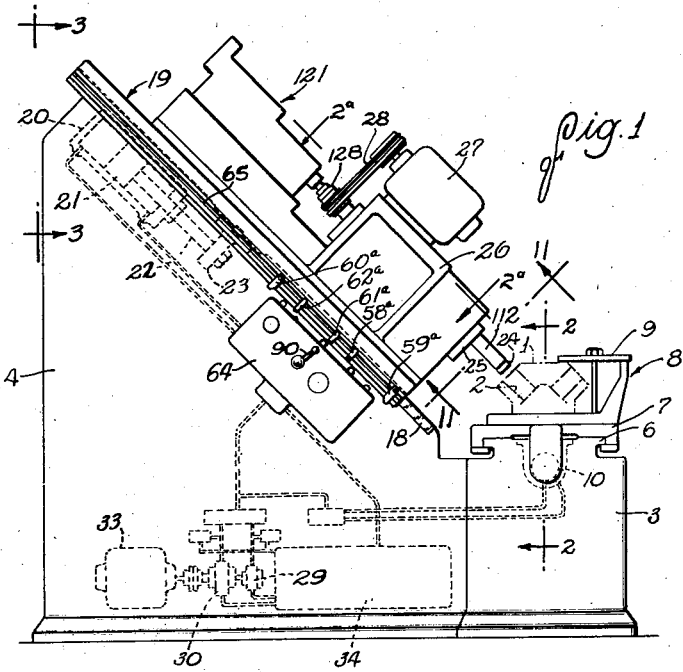
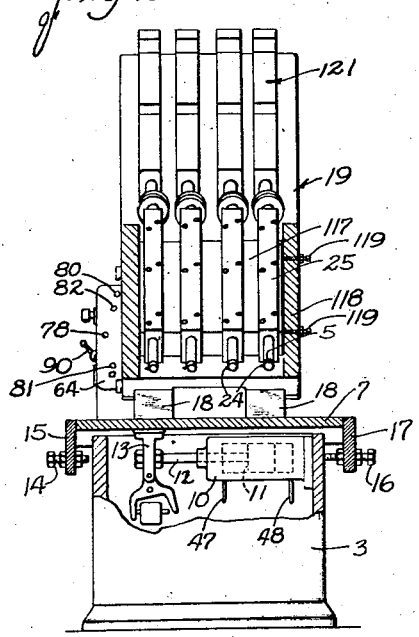
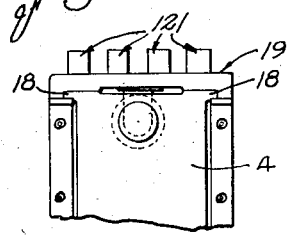
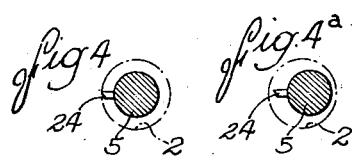
INVENTOR
Ira J. Snader
By Parker, Carlson, Pigner & Hubbard
ATTORNEYS

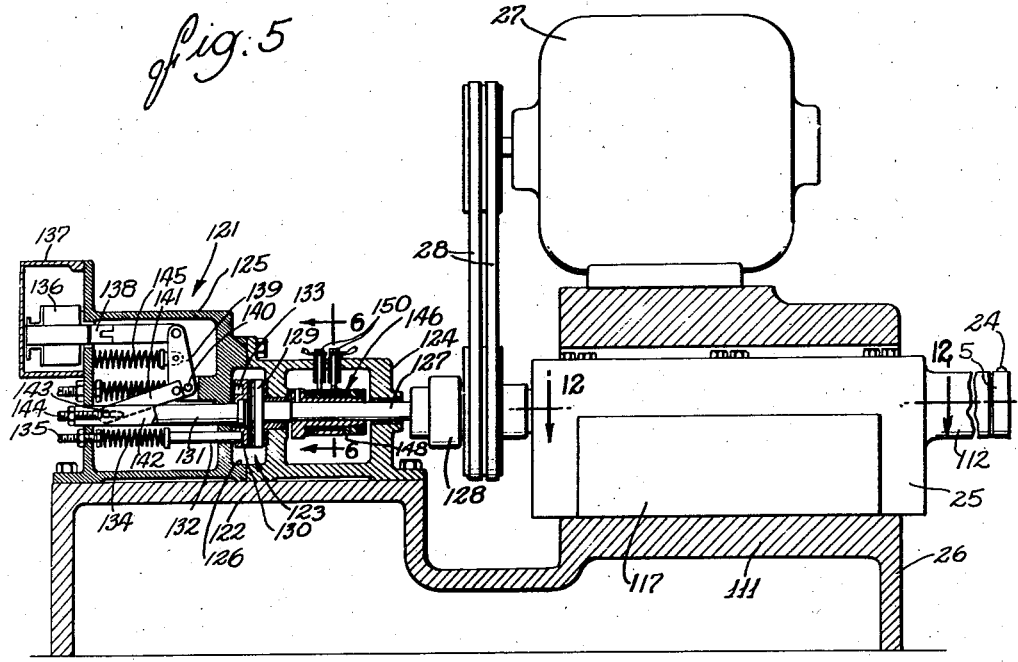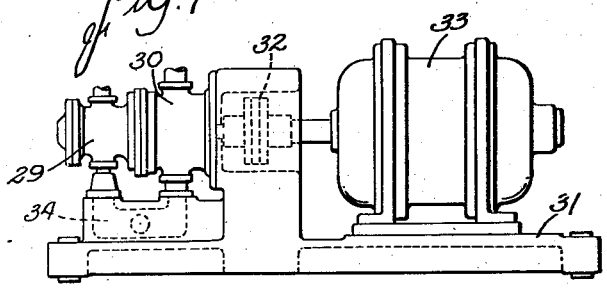

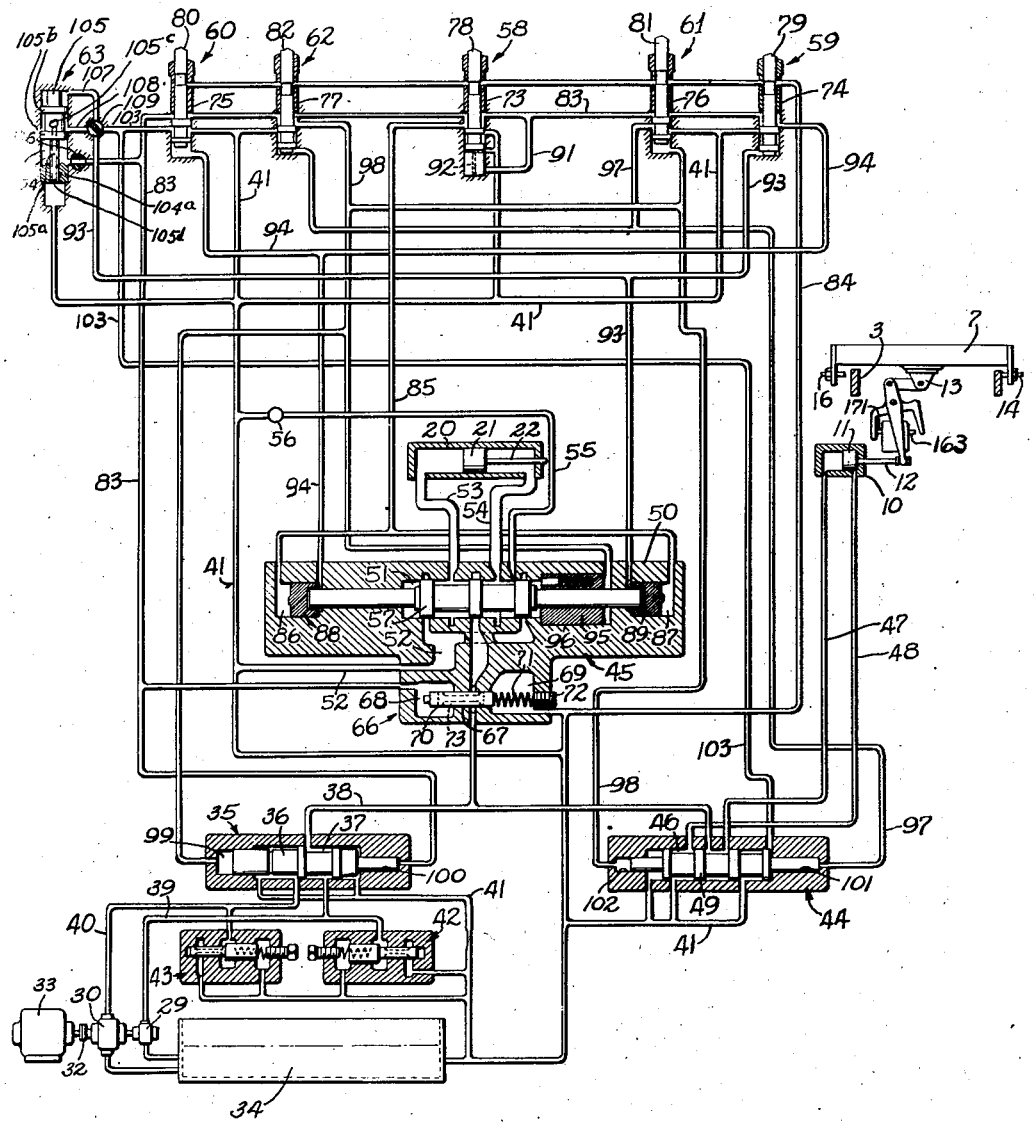

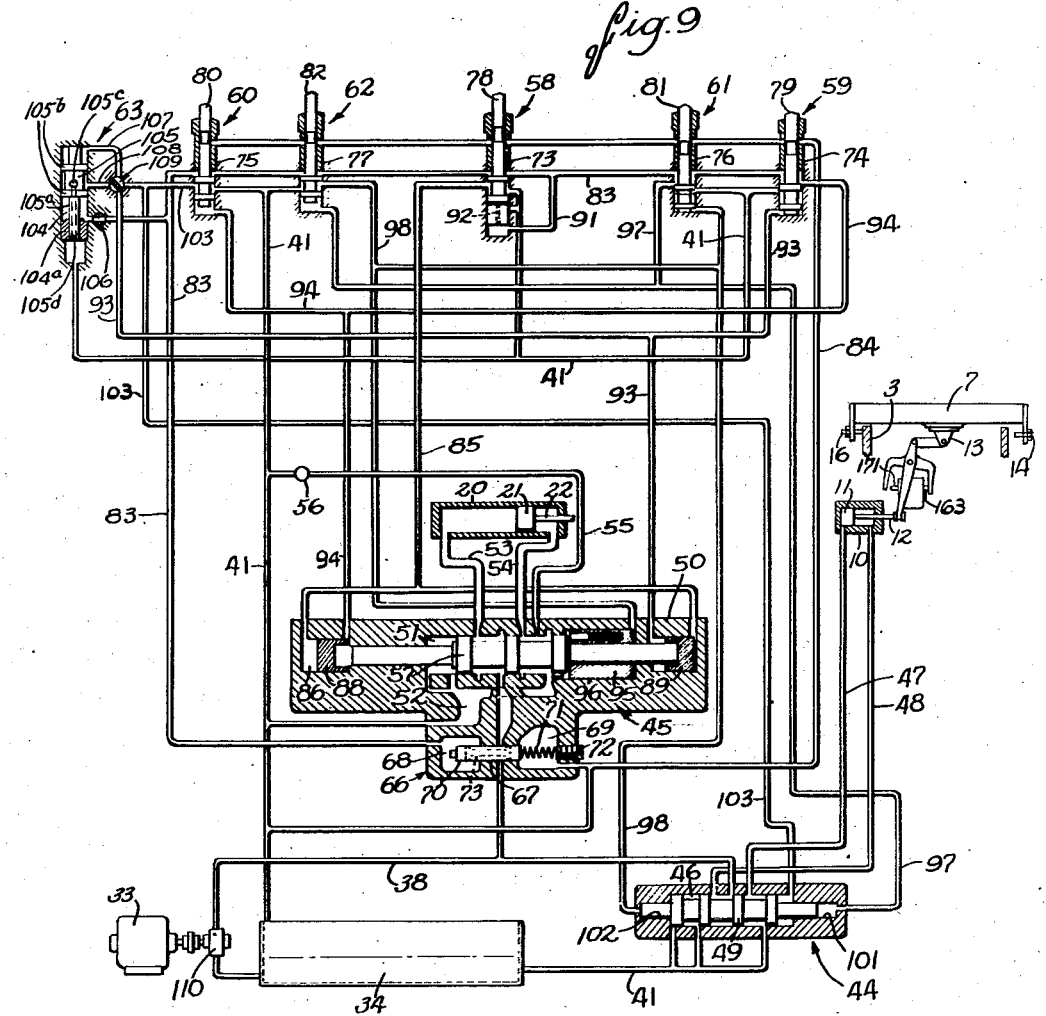

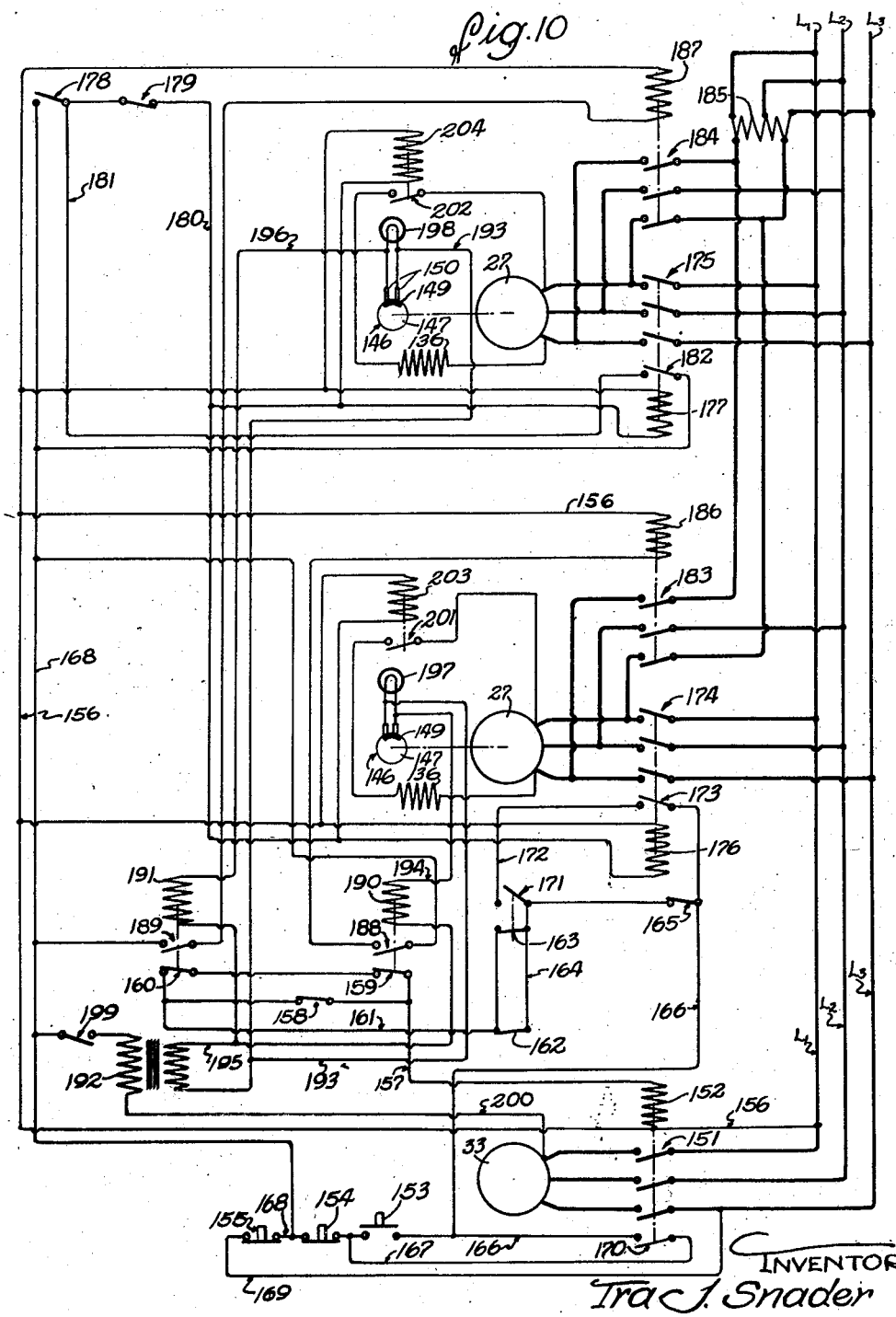

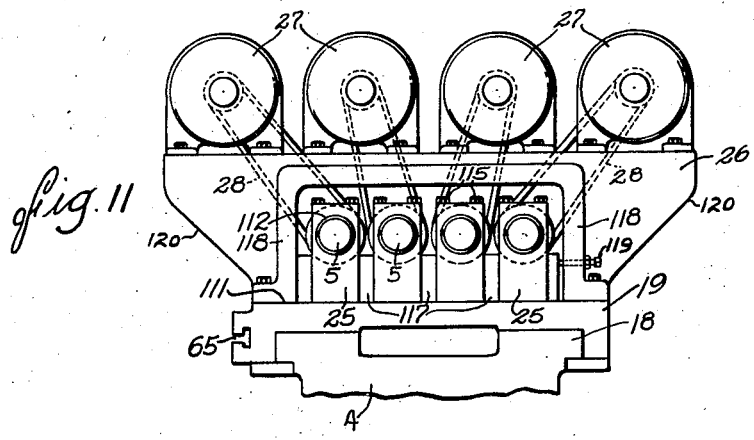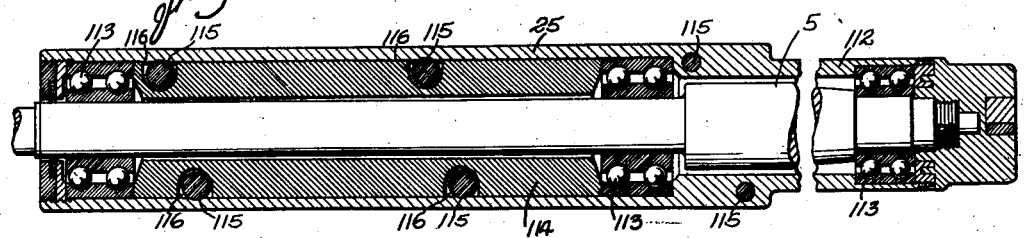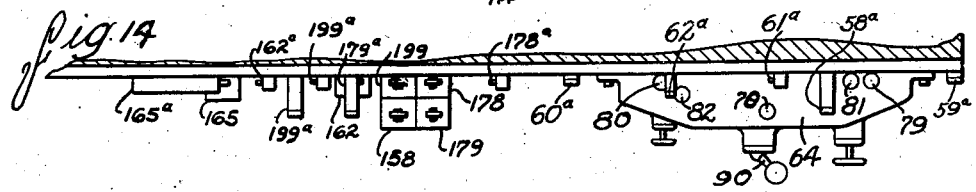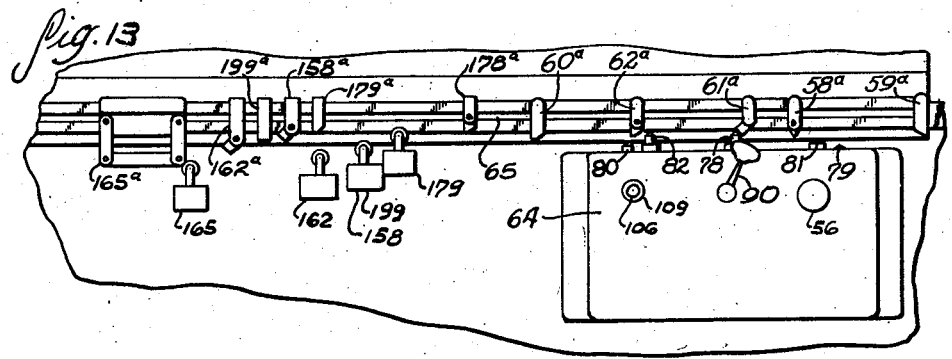

UNITED STATES PATENT OFFICE 2,391,487

MACHINE TOOL

Ira J. Snader, Detroit, Mich., assignor to Ex-Cell-O Corporation, Detroit, Mich., a corporation of Michigan Application February 26, 1937, Serial No. 127,967

8 Claims. (Cl. 77—1)

The present invention relates to improvements in machine tools, and has particular reference to a new and improved machine tool with one or more spindles, each carrying one or more tools, whereby a multiplicity of cutting operations, such, for example, as boring, turning, facing, etc., may be performed upon the work in the same cycle.

One of the objects of the present invention is to provide a novel hydraulic drive and control for automatically translating a reciprocatory tool spindle support through a cycle comprising a feed stroke in one direction, a dwell at the end of the feed stroke, and a rapid return traverse in the reverse direction.

An important object resides in the provision of new and improved means for automatically starting and stopping the machine spindles in predetermined relation to the feed stroke, and for causing the spindles to stop in a definite uniform rotary position relative to the work.

Another object is to provide novel means for effecting a lateral separation of the work and the cutting tools after stopping the latter in predetermined rotary position and before axial withdrawal thereof.

A further object resides in the provision of a new and improved electric spindle control which is so interlocked with the hydraulic control that the cutting feed cannot be instituted unless the work has been moved into operative position and the spindles are rotating, and the return movement cannot be instituted unless the spindles have been stopped in proper position and the work retracted into inoperative position to permit withdrawal of the tools without contacting the finished surfaces.

Further objects and advantages will become apparent as the description proceeds.

In the accompanying drawings,

Figure 1 is a front elevational view of a machine tool embodying the features of my invention, part of the control elements not being shown to avoid complexity.

Fig. 2 is a fragmentary right end elevational view of the machine, partially in vertical section along line 2—2 and partially in section along line 2ª—2ª, of Fig. 1.

Fig. 3 is a fragmentary end elevational view taken along line 3—3 of Fig. 1.

Figs. 4 and 4ª are two diagrammatic views respectively illustrating the relative adjustment of one tool spindle axis and work axis in boring position and in inoperative or laterally retracted position.

Fig. 5 is a longitudinal sectional view on an enlarged scale illustrating the spindle mounting, drive and positioning means.

Fig. 6 is a transverse sectional view taken along line 6—6 of Fig. 5.

Fig. 7 is a side elevational view on an enlarged scale of a pump unit forming part of one form of the hydraulic system.

Fig. 8 is a diagrammatic representation of the hydraulic system.

Fig. 9 is a diagrammatic representation of a modified form of hydraulic system.

Fig. 10 is a diagrammatic representation of the electrical control circuits for the machine.

Fig. 11 is a view of the spindle carriage taken along line 11—11 of Fig. 1.

Fig. 12 is a longitudinal sectional view of one of the spindle supports taken along line 12—12 of Fig. 5.

Fig. 13 is a fragmentary side elevational view of the machine.

Fig. 14 is a fragmentary plan view of the construction illustrated in Fig. 13.

Referring more particularly to the drawings, the machine tool, constituting the exemplary embodiment of the invention, is adapted for various kinds of cutting operations, and although not limited thereto is especially useful for precision boring. In the present instance, the work is illustrated as a V-type internal combustion engine block 1 (see Fig. 1) having a plurality of horizontally inclined cylinders 2 along each side to be bored.

The machine tool comprises a base having a horizontal pedestal 3 on which the block 1 is adapted to be mounted, and a column 4 at one side thereof and on which a plurality of tool spindles 5 are mounted for reciprocation in operative relation to the work cylinders 2.

The top of the pedestal 3 is provided with parallel horizontal transverse guideways 6 on which a work slide or table 7 is supported for reciprocation. A suitable work fixture 8 is mounted on the table 7, and is adapted to support the engine block 1 which may be removably secured in position by means of a clamp 9. To provide means for reciprocating the table 7, a cylinder means 10 is mounted in fixed position within the pedestal 3, and between and parallel to the guideways 6. Slidably disposed in the cylinder 10 is a piston 11 having a piston rod 12 operatively connected to a bracket 13 on the underside of the table 7.

The reciprocation of the table 7 is limited and subject to adjustment so as to permit movement of the work into and out of operative cutting relationship to the tool spindles 5. Rearward movement of the table 7 is definitely and accurately limited to define the operative position of the work (see Fig. 4) by a stop screw 14 disposed for end engagement with the front of the pedestal 3 and adjustably secured in a depending bracket 15 on the front end of the table. Similarly, forward movement is limited to define the inoperative position (see Fig. 4ª) by a stop screw 16 adjustably secured in a bracket 17 on the rear end of the table 7.

The column 4 is provided on the top with guideways 18 (see Fig. 3) which extend at right angles to the guideways 6, and which are inclined downwardly toward the table 7 at such an angle, for example 45°, that the spindles 5 may be disposed in axial alignment with the respective cylinders 2 when the block 1 is shifted rearwardly into operative position (see Fig. 4). A tool slide or carriage 19 is mounted for reciprocation on the guideways 18. To provide means for reciprocating the carriage 19, a cylinder 20 is mounted within the column 4 and extends in the direction of reciprocation. A piston 21 is slidably disposed in the cylinder 20, and has a piston rod 22 operatively connected to a bracket 23 fixed to the underside of the carriage 19.

Any suitable number of spindles 5 with any desired number and character of cutting tools may be provided depending on the requirements of the work. In the present instance, one spindle 5 is provided for each of the engine cylinders 2, and each spindle has a radially projecting fly tool 24 adapted for finish cylinder boring. The spindles 5 are journaled in suitable bearings 25 removably mounted on a base bracket 26 fixed on the tool carriage 19. In the present instance, four spindles 5 are provided, and each is driven through a multiple-belt drive 28 by an individual electric motor 27 mounted on the bracket 26.

The pressure fluid for actuating the table 7 and carriage 19 is supplied selectively to opposite ends of each of the cylinders 10 and 20 from a hydraulic system illustrated schematically in Fig. 8. The system may receive fluid under pressure from any suitable source, such, for example, as a high pressure low volume pump 29 used for the tool feed and for positioning the work table 7, and a low pressure high volume pump 30 used for rapid approach and return. These pumps are mounted in tandem on a base 31 within the pedestal 4 (see Fig. 7), and are connected for a joint drive through a flexible coupling 32 to an electric motor 33. The inlet of each pump is connected to a sump or reservoir 34 cast integral with the interior of the pedestal 4.

Connection of the pumps 29 and 30 is under the control of a pressure selecting valve 35 comprising a valve spool 36 slidable in a valve chamber 37 opening to a main pressure supply line 38. In one extreme position of adjustment, the valve spool 36 serves to connect the discharge line 39 of the high pressure pump 29 to the line 38, and the discharge line 40 of the low pressure pump 30 to a drain line 41 opening from the chamber 37 to the sump 34. In the other extreme position of adjustment, the foregoing connections are reversed. The pump discharge lines 39 and 40 have branch connections respectively with high and low pressure relief valves 42 and 43 discharging to the drain line 41. These relief valves may be adjusted at will to make available any desired selective high and low pressures as required by the nature of the operation to be performed.

The pressure fluid supply line 38 has two branches adapted to be connected respectively through a table index valve 44 selectively to opposite ends of the cylinder 10, and a through main control valve 45 selectively to opposite ends of the cylinder 20. The index valve 44 comprises a valve chamber 46 having appropriately spaced port connections with the supply line 38, the drain line 41 and two lines 47 and 48 leading to opposite ends of the cylinder 10. A valve spool 49 is reciprocable in the chamber 46, and in its extreme positions of adjustment acts in one instance to connect the line 38 to the line 47 and the line 48 to the drain line 41, thereby advancing the work into operative position, and in the other instance to reverse the connections, thereby retracting the work out of engagement with the tools (see Fig. 4ª).

The main control valve 45 comprises a valve housing 50 formed with a valve bore 51 having appropriately spaced port connections with the supply line 38, a branched and relatively unrestricted exhaust passage 52 opening to the drain line 41, two lines 53 and 54 leading to opposite ends of the cylinder 20, and an exhaust line 55 connected to the line 41 in parallel to the passage 52 and including an adjustable feed control orifice valve 56. A valve spool 57 is reciprocable in the bore 51, and controls the port connections to effect selectively a rapid approach, a feed, a rapid return. Thus, when the spool 57 is in the extreme right hand position, the supply line 38 is connected to the line 53, and the line 54 opens to the unrestricted exhaust passage 52, for rapid approach of the carriage 19. Upon movement of the valve spool 57 to the left sufficient to close the passage 52, but not the line 55, the exhaust fluid from the line 54 is obliged to pass through the restricted line 55, thereby reducing the rate of travel to a cutting feed. When the spool 57 is in the extreme left hand position, the supply line 38 is connected to the line 54 and the line 53 opens to the unrestricted exhaust passage for rapid return. In its intermediate position, as shown in Fig. 8, the valve spool 57 closes the line 38 and the exhaust passage 52 to stop the operation of the carriage 19.

The hydraulic circuits thus far described constitute the main operating circuits of the system, and are under the full pressure existing in the line 38. The various valves, with the exception of the control valve 45, namely, the valves 35, 42, 43 and 44, are mounted within the column 4. All of these valves are interlocked with and controlled from a pilot control comprising pilot control circuits under a relatively low pressure, and a plurality of pilot valves, namely, a start and stop valve 58, direction control valves 59 and 60, a rapid traverse valve 61 and a feed valve 62, operable by the carriage 19. The pilot control also includes a dwell mechanism 63 for preventing immediate institution of the rapid return at the end of the feed stroke.

The various operating elements of the pilot control, together with the main control valve 45 and the restricted adjustable orifice valve 56 are incorporated in a unitary control panel 64 (see Fig. 1) which is mounted on the front side of the column 4, and which is so arranged that the pilot valves 58 to 62 are operable selectively by suitable control dogs 58ª to 62ª adjustably mounted in a T-slot 65 in the side of the carriage 19. By selection and adjustment of the dogs, and by adjustment of the orifice valve 56 and the dwell mechanism 63, various machine cycles differing in movement rates and sequences may be obtained.

Fluid is supplied to the pilot control circuits at a relatively low pressure under the control of a regulating valve 66 in the housing 50. The valve 66 comprises a bore 67 opening from the line 38 at one end to a pressure chamber 68 and at the other end to a drain chamber 69 connected to the drain line 41. A plunger 70 is slidable in the bore 67, and is urged against the pressure in the chamber 68 by a compression spring 71 having a tension adjusting seat 72. The plunger 70 is formed with a longitudinal bore 73 open to the chamber 68, and adapted for communication with the line 38 or the chamber 69. It will be evident that the valve 66 serves to meter fluid from the line 38, which opens about the plunger 70, to the pressure chamber 68 which serves as the primary source of fluid supply for the pilot control circuits. When the pressure in the chamber 68 acting on the end of the valve member 70 balances the spring 71, the supply of fluid will be cut off. In the event of high pressure leakage past the valve 66 into the chamber 68, the resulting excess pressure will urge the plunger 70 to the right and allow fluid to escape through the bore 73 to the drain chamber 69. As a result, a balanced relatively low pressure is substantially maintained in the chamber 68 at all times.

The purpose in utilizing a uniform pressure in the pilot control lower than that in the operating circuits is to reduce the force required to operate the pilot valves 58 to 62, and thereby to diminish the load on the table dogs 58ª to 62ª. Also, the pressure available to actuate the valves 35, 44 and 45 will remain constant at all times regardless of the prevailing pressure in the main operating circuits which is subject to selection and adjustment.

The pilot valves 58 to 62 comprise a plurality of bores 73 to 77 formed in the panel 64, and a plurality of spool valve plungers 78 to 82 reciprocable in the bores and projecting therefrom for selective actuation by the dogs 58ª to 62ª. Low pressure fluid from the chamber 68 is directed through a branched line 83 to the respective valve bores 73 to 77, and acts against the upper piston areas of the spool plungers 78 to 82. A leakage drain line 84 opens from the upper end portion of each of the valve bores 73 to 77 to the line 41.

The start and stop valve 58 is available to effect adjustment of the main control valve 45 into neutral position. Thus, the valve bore 73 has appropriately arranged port connections with the drain line 41 and a branched line 85 opening to the outer ends of two cylinders 86 and 87 at opposite ends of the main valve bore 51. Two floating stop pistons 88 and 89 are slidable in the cylinders 86 and 87 and adapted for separable engagement with opposite ends of the spool valve 57. When the stop plunger 78 is depressed, the lines 83 and 85 are connected, and hence the pistons 88 and 89 are held against the inner ends of the cylinders 86 and 87 to center the spool valve 57. When the plunger 78 is elevated, the line 85 is connected to the drain line 41, and the spool valve 57 is released for actuation under the control of the direction pilot valves 59 and 60 as hereinafter described.

The plunger 78 may be operated manually from the front of the panel 64 by means of a hand lever 90 to start and stop the carriage 19, and is self-maintained in either position. When the plunger 78 is elevated to start the operation, it is locked in operative position by pressure fluid in the lower end of the bore 73 supplied from the line 83 through a branch line 91. When the plunger 78 is depressed to stop the operation, the line 91 is closed, and the lower end of the bore 73 is vented through a passage 92 to the drain line 41.

The pilot valves 59 and 60 are operable respectively to institute the forward and return movements of the carriage 19, and to reset each other alternately for coaction with the dogs 59ª and 60ª. Each has port connections with the supply and drain lines 83 and 41 and with cross lines 93 and 94 opening respectively to the sides of the valve bores 75 and 74 and to the lower ends of the bores 74 and 75 and also to the inner ends of the cylinders 87 and 86. The port connections are so arranged that when the plunger 79 is depressed, assuming the dwell mechanism 63 is disabled as hereinafter explained, the line 94 will be connected to the supply line 83 and direct fluid under pressure to the lower end of the valve bore 75, thereby causing upward movement of the plunger 80 to connect the line 93 through valve 109, line 103 and valve 60 to the drain line 41. As a result, the plunger 79 is locked in depressed position, and the spool valve 57 is shifted to the right to institute the forward movement. Conversely, when the plunger 80 is depressed, pressure fluid is supplied through the line 93 to the inner end of the cylinder 87 and the lower end of the bore 74, and is exhausted, as a result of the attendant outward movement of the plunger 79, from the inner end of the cylinder 86 and the lower end of the bore 75, to institute the rapid carriage return.

The pilot valves 61 and 62 control each other and also the valves 35, 44 and 45 for selective rapid approach and feed and correlated positioning of the work table 7. The approach feed position of the main spool valve 57 is determined by a stop collar 95 reciprocable in a cylinder 96 at the right end of the valve bore 51. When the collar 95 is moved into the left hand position, it will shift the spool valve 57 against the pressure in the inner end of the cylinder 86 and into an intermediate position to close the passage 52 but not the restricted exhaust line 55. During the rapid approach, the plunger 81 is depressed, and connects the pressure line 83 to a cross line 97 opening to the lower end of the bore 77, and the plunger 82 is elevated, and connects the drain line 41 to a cross line 98 having branches opening to the lower end of the bore 76 and the right end of the cylinder 96. Therefore, the plunger 81 is hydraulically locked in lowered position, and the collar 95 is relieved so that the main valve spool 57 may occupy its extreme right hand position. During feed, the plunger 82 is depressed, and connects the pressure line 83 to the cross line 98, thereby directing pressure fluid to the lower end of the bore 76 and the right end of the cylinder 96. As a result, the valve spool 57 is held in feed position by the collar 95, and the plunger 81 is elevated to connect the cross line 97 to the drain line 41.

The pressure selecting valve 35 is actuated simultaneously with the speed adjustment under the control of the pilot valves 61 and 62 so as to connect the high pressure pump 29 during feed, and the low pressure pump 30 during rapid traverse. The cross line 98 has a branch opening to a cylinder 99 slidably receiving one end of the valve spool 36. The other end of the valve spool 36 is reduced in size and slidable in a cylinder 100 in constant communication with the pressure line 83. When the valve plunger 81 is depressed to establish rapid traverse, the cylinder 99 is connected through the cross line 98 to the drain line 41 and hence the constantly applied pressure in the cylinder 100 will shift the valve spool 36 into the left hand position to connect the pump 30 through the line 40 to the main pressure line 38 and to connect the pump 29 through the line 39 to the drain line 41. When the pilot valve plunger 82 is depressed to institute the feed movement, pressure is applied through the line 98 to the cylinder 100 and acts to shift the valve spool 36 into the right hand position, thereby reversing the pump connections.

The table index valve 44 also is adjusted simultaneously with the speed changes so as to shift the table 7 into operative position (see Fig. 4) during feed and into inoperative position (see Fig. 4ª) during rapid traverse. To this end, the cross lines 97 and 98 have branches connected respectively to the outer ends of two cylinders 101 and 102 in which the opposite ends of the valve spool 49 are slidably disposed. During the rapid approach and rapid return the line 97 is under pressure so that the valve spool 49 is located in the left hand position to connect the lines 38 and 48. During the feed movement, the line 98 is under pressure so that the valve spool 49 is located in the right hand position to connect the lines 38 and 47.

The valve 44 is also adjustable, independently of the valves 61 and 62, into position to effect movement of the table 7 into inoperative position whenever the system is set for carriage return, as by depression of the plunger 80. A line 103 opens at one end to the valve bore 75 for communication with the line 83 when the plunger is depressed, and at the other end to the end of the valve bore 46 opposite the cylinder 102. The line 103 normally constitutes a branch of the line 93. At the end of the boring stroke, pressure fluid is supplied through the line 103, and will move or hold the valve spool 49 to the left against the pressure, if any, in the cylinder 102.

In operation, when the carriage 19 is in retracted inoperative position, the plungers 78, 79 and 81 are depressed, and the plungers 80 and 82 are elevated, thereby conditioning the system for rapid approach. To start the operation, the plunger 78 is elevated by means of the hand lever 90. At the end of the rapid approach, the dog 62ª depresses the plunger 82, thereby elevating the plunger 81. As a result, the collar 95 shifts the valve 45 into feed position, the pump 29 is connected to the line 38, and the work table 7 is moved into operative position. At the end of the boring operation, the dogs 60ª and 61ª depress the plungers 80 and 81, thereby elevating the plungers 79 and 82 to shift the table 7 into inoperative position, to connect the pump 30, and to reverse the direction valve 45. At the end of the return movement, the dog 79ª depresses the plunger 79 to institute rapid approach, but immediately after reversal, the dog 78ª depresses the plunger 78 to stop the carriage 19.

On occasion, it may be desirable to delay the reversal at the end of the boring operation, and the dwell mechanism 83 is selectively available for this purpose. This mechanism comprises a cylinder 104 in which a differential spool piston 105 is reciprocably disposed. The piston 105 has a stem 105ª extending slidably through a bushing 104ª fixed in the lower end portion of the cylinder 104 connected to the drain line 41. The cylinder 104 between the bushing 104ª and the reduced area of the piston 105 is constantly connected through an adjustable restricted orifice 106 to the pressure line 83. The other end of the cylinder 104, exposed to the large area of the piston 105, opens to a line 107. Another line 108 opens from an intermediate point in the cylinder 104, and is adapted to be connected in the elevated position of the piston 105 to the space between two collars 105ᵇ on the piston and thence through a radial port 105ᶜ and an axial passage 105ᵈ to the lower end of the cylinder 104, and to be uncovered by the piston 105 when the latter is moved into the other extreme position by the application of a differential pressure. A manually adjustable two position valve 109 is available selectively to connect either the line 107 to the line 103 opening to the valve bore 75 for communication with the pressure line 83 when the plunger is depressed, and the line 108 to the line 93, or to connect the line 107 to the line 108 and the line 93 through the line 103 directly to the valve bore. The orifice 106 and the valve 109 are mounted in the panel 64.

When a dwell is not desired, the valve 109 is adjusted to connect the lines 93 and 103, and the system will operate as hereinbefore described. When a dwell is desired, the valve 109 is adjusted into the other position as shown in Fig. 8, so that the line 93 is not directly connected to the pilot valve 60, but will receive pressure fluid from the cylinder 104 or will exhaust through the piston 105 directly to the line 41. Depressing the plunger 80 at the end of the boring operation will not immediately cause pressure fluid to be directed into the line 93. Instead, the carriage 19 will move into a fixed limit position, and pressure fluid will be directed through the line 107 to the cylinder 104. The piston 105 will move in response to the differential pressure at a rate determined by the setting of the orifice 106, and at the end of this movement will open the line 108 to supply pressure fluid to the line 93. The delay, however, will not prevent immediate operation of the index valve 44 to effect movement of the table 7 into inoperative position, since the line 103 is not controlled by the valve 109.

Fig. 9 illustrates a modified form of hydraulic system in which a variable delivery pump 110 is substituted for the pumps 29 and 30. The specific details of the pump 110 per se form no part of the present invention, and hence are not disclosed. It is sufficient to say that the pump 110 is self-adjustable in response to the back pressure load. At low loads, the dump delivers at maximum capacity. When the load is increased, as, for example, by connecting the orifice 56 into the exhaust side of the system, the pump will maintain a constant manually adjustable maximum delivery pressure, and will deliver whatever volume of pressure fluid the system will take at that pressure. A pump of this character is disclosed in a copending application by Ira J. Snader and Max A. Mathys, Serial No. 147,178, filed June 9, 1937 (Patent No. 2,299,234).

Since the pump 110 is adapted to supply fluid at different pressures for rapid traverse and feed, the system in Fig. 9 does not include relief valves 42 and 43 nor a pressure selecting valve 35, but in all other respects is like the system of Fig. 8, with the corresponding parts designated by the same reference characters. The outlet of the pump 110 is connected directly to the pressure line 38, and the system is shown in operation for rapid approach.

It is desirable to bore all of the work cylinders 2 on one side of the block 1 in one operation to avoid the necessity for relocation or indexing. A difficulty arises when the spacing of the cylinders 2 is less than the minimum obtainable spacing of the spindle axes. It has therefore been the practice heretofore in such instances to bore alternate cylinders 2 in one operation, and then to index or reload the work and bore the remaining cylinders. The foregoing difficulty is avoided in the present instance by the provision of a spindle construction and mounting permitting convenient lateral adjustment of the spacing of the spindle axes, and affording a minimum spacing less than the cylinder spacing of most standard automotive engine blocks. The spindle construction is covered in my Patent No. 2,281,628, issued May 5, 1942, on divisional application Serial No. 255,175, filed February 8, 1939.

Each of the spindle bearings 25 is in the form of a solid body bracket (see Figs. 2, 5, 11 and 12) which is secured directly to a mounting pad 111 on the base bracket 26, and which is rectangular in cross section and formed with a tubular extension 112 on one end. The spindle 5 extends longitudinally through the bracket 25, and is supported therein by a plurality of spaced antifriction bearings 113. Two of the bearings 113 are mounted in opposite ends of the rectangular body portion and are separated by a spacer sleeve 114. To permit close spacing of the spindle axes, each bearing bracket 25 is made relatively narrow, and preferably just wide enough to accommodate the bearings 113. Bolts 115 are provided for clamping the bracket 25 to the pad 111, and are arranged in sets spaced axially of the bearings 113 so as not to require extra side wall thickness. The bolts of each set are staggered to avoid undue weakening of the side walls, and the bolts of the intermediate set extend through recesses 116 in opposite sides of the sleeve 114. To offset the loss in strength and rigidity at the side walls, the top and bottom walls, particularly the latter, of each bracket 25 are increased in vertical thickness and formed with square corners, thereby providing substantial mass with an economy in lateral space. Consequently, the tubular extension 112 is disposed eccentrically or in vertically offset relation to the center line of the bracket 25.

The various brackets 25 may be disposed in flat side engagement on the mounting pad 111 for minimum spacing. To provide a larger spacing or an uneven spacing as required for different engine blocks, suitable flat rectangular spacer blocks 117 of proper thicknesses may be interchangeably interposed between the various spindle brackets 25. For spacing less than that shown, the pulleys on the spindles 5 may be staggered to avoid interference. Preferably, the brackets 25 and spacer blocks 117 are spanned and covered by an inverted U-shaped bridge member 118 rigid with the base bracket 26. In assembly, the brackets 25 and blocks 117 are positioned underneath the bridge 118 in properly spaced relation, and are held together against one side wall of the bridge by screws 119 threaded through the other side wall while the bolts 115 are tightened.

The spindle motors 27 preferably are mounted on the top of the bridge 118. To provide sufficient space for the motors 27, side extensions 120 may be formed on opposite sides of the bridge 118.

The tools 24 and the work are maintained out of contact during the axial withdrawal of the spindles 5 so as to prevent the formation of objectionable tool marks on the finished work surfaces. To this end, the spindles are stopped in a predetermined position of rotation at the end of the boring operation preparatory to lateral separation by shifting of the work table 7. Referring particularly to Fig. 4, each tool 24 should project generally in the same direction as the movement of the table 7 toward inoperative position. The position of rotation in which each spindle 5 must be stopped need not be exact, but may be anywhere within an angular range extending over a substantial portion of one side of the tool circle of revolution. The extent of the permissible range is such that the tool 24 will not engage the opposite side of the work bore at the end of the work table movement. A range of approximately 90° is satisfactory.

A plurality of positioning devices 121 (see Figs. 5 and 6) are provided for stopping the spindles 5 with the tools 24 located within the permissible angular range, and are conveniently secured side by side to a mounting pad 122 on the upper end portion of the base bracket 111. Each device 121 comprises a brake 123 which is always applied when the spindle motor circuit is open, and released when the circuit for forward rotation is closed. To prevent overrun of the aforesaid range, the device 121 is operable in conjunction with means for automatically reversing the motor drive at a slow speed and during brake application before final spindle positioning, and to this end comprises means for interrupting the motor circuit for the reverse drive when the spindle reaches the approach limit of the range.

More particularly, each positioning device 121 comprises two hollow housings 124 and 125 arranged end to end and bolted together and to the mounting pad 122 in line with the associated spindle 5. The abutting ends of the housings 124 and 125 are hollowed to define an intermediate chamber 126 within which the brake 123 is located. Journaled in and extending through the end walls of the housing 124 is a shaft 127 connected through a flexible coupling 128 to the upper end of the associated spindle 5.

The brake 123 may be of any suitable form or character, and preferably is of the friction disk type comprising a disk 129 rigidly connected to and rotatable with the shaft 127, and an opposed nonrotatable axially movable disk 130 with a friction facing. The disk 130 is fixed on one end of a rod 131 extending slidably through the housing 125. A plurality of parallel plungers 132 are annularly arranged about the rod 131, and extend slidably through the inner end wall of the housing 125 into recesses or seats 133 in the outer face of the disk 130. Coiled compression springs 134 engage the free ends of the plungers 132 and seat against screws 135 adjustably threaded through the outer end wall of the housing 125. The spring actuated plungers 132 serve to hold the disk 130 against rotation, and tend to move it axially into braking engagement with the disk 129. The brake pressure may be adjusted by turning the screws 135 to vary the compression of the springs 134.

Electromagnetic means is provided for releasing the brake 123, and in the present instance comprises a solenoid 136 mounted within an enclosure 137 on the exterior of the housing 125, and having an axially movable core 138. One end of the core 138 extends into the housing 125 and is connected to the free end of a lever arm 139. The other end of arm 139 is pivotally mounted on a pin 140, and is connected at one side of its pivot to a link 141 extending generally longitudinally of the rod 131. The other end of the link 141 extends into a longitudinal slot 142 in the rod 131, and is therein fulcrumed on a pin 143. This pin is adapted for engagement with a screw 144 adjustably threaded into the outer end of the rod 131 to determine the opening movement of the brake 123. The heel of the arm 139 and the link 141 constitute a toggle with an anchor pivot at the pin 140. A coiled compression spring 145 acting on the arm 139 tends to break the toggle joint for brake application, and the solenoid 136 when energized acts to straighten the joint to effect brake release.

Mounted within the housing 124 is a commutator 146 for controlling the circuits for the spindle motor 27 during the reverse drive. The commutator 146 comprises a split drum 147 of electrical conducting material mounted on an insulating bushing 148 in turn fixed on the shaft 127. A ninety degree (90°) segment 149 of insulating material, such as mica, is embedded or otherwise interposed between the split edges of the drum 147. Two electrical contact brushes 150 are mounted in the top wall of the housing 124 and are spaced longitudinally of the shaft 127 for end bearing engagement with the drum 147 and segment 149. The drum 147 and the brushes 150 constitute a switch in the reverse drive circuits for the motor 27 and the insulating segment 149 defines the stopping range of the tool 24. Since the reverse drive is slow and resisted by the brake 123, the spindle 5 will stop before the segment 149 can coast past the brushes 150.

The motor 33 for the pumping means of the hydraulic system, and the spindle drive motors 27 are controlled by an electric system illustrated diagrammatically in Fig. 10. The circuits for the spindle drive motors are alike and in parallel, and hence may be adapted to any desired number of tool spindles. To avoid unnecessary duplication in the description, only circuits for two of the spindle motors have been shown.

The electric and hydraulic systems are interlocked in such a manner that the hydraulic drive will stop at the start of the feed if the spindles 5 are not in operation or if the work table is not in operative position, and at the start of the return movement if the spindles are not idle and the table is not in inoperative position.

The electric system may be connected to any suitable source of current, such, for example, as alternating current supply mains or lines $L_1$, $L_2$ and $L_3$.

The hydraulic system drive motor 33 is adapted to be connected for unidirectional rotation to the supply mains by a normally open switch 151 movable into closed position by a coil 152. Excitation of the coil 152 is primarily under the control of a normally open starting switch 153, a normally closed motor stop switch 154 and a normally closed master stop switch 155 for the entire system. These switches are manually operable, and may be of the push button type. When the switch 153 is closed momentarily, a circuit is completed from the main $L_1$, through a line 156, the coil 152, a line 157, a normally closed switch 158 and/or normally closed switches 159 and 160 in series, a line 161, a normally closed switch 162 and/or a switch 163, a line 164, a normally closed switch 165 adapted to be opened during the boring feed movement, a line 166, the starting switch 153, a line 167, the stop switch 154, a line 168, the master stop switch 155 and a line 169 to the main $L_3$. A switch 170 operable with the switch 151 serves to complete a holding circuit for the coil 152 across the lines 166 and 167 in parallel to the starting switch 153. It will be evident that the motor 33 will stop upon the opening of either of the switches 154 and 155.

The switches 159 and 160 are adapted to be open during the reverse spindle drive, and the switch 158 is adapted to be opened momentarily by a cam 158a on the carriage 19 at the start of the return movement. If the spindles 5 are idle, opening of the switch 158 will not interrupt the circuit for the motor 33. However, if the spindles are operating, opening of the switch 158 will stop the hydraulic drive to prevent the return movement.

A circuit parallel to the switch 165 is adapted to be closed from the line 164 through a switch 171, a line 172 and a switch 173 to the line 166. The switches 163 and 171 are connected for joint operation by the table 7 so that when the table is in inoperative position only the switch 163 will be closed and when the table is in operative position only the switch 171 will be closed. The switch 162 is adapted to be opened momentarily by a cam 162a immediately after the start of the carriage return movement, and the switch 165 is held open by a cam 165a during the boring feed stroke. The switch 173 is closed when the spindles 5 are in forward drive. At the start of the approach movement, the circuit is closed through the switches 162 and 165. At the start of the feed movement, the circuit will be closed through the switches 162, 171 and 173 if the table 7 is in operative position and the spindles 5 are operating. If these conditions are not fulfilled, the motor 33 will be disconnected to stop the carriage 19 at the start of the feed movement. At the end of the feed movement, the switch 165 is closed so that the switches 171 and 173 may be opened without interrupting the circuit. However, should the table 7 not be in inoperative position immediately after the start of the return movement, opening of the switch 162 will interrupt the circuit.

The spindle motors 27 are adapted to be connected for high speed rotation in one direction directly to the supply mains $L_1$, $L_2$ and $L_3$ respectively by two normally open switches 174 and 175 movable into closed position by two coils 176 and 177 jointly under the control of a normally open switch 178 and a normally closed switch 179. The switch 178 is adapted to be closed momentarily by a cam 178a at the start of the rapid approach movement, and when closed completes a circuit from the main $L_1$, through the line 156, the coils 176 and 177 in parallel, a line 180, the switch 179, and the switch 178 to the line 168. A switch 182 operable with the main circuit switch 175 serves to close a holding circuit for the coils 176 and 177 through a line 181 across the switch 178. It will be evident that the coils 176 and 177 will be deenergized to effect opening of the motor switches 174 and 175, without interrupting the circuit for the motor 33, upon the opening of switch 179. The switch 179 is adapted to be opened by a cam 179a just before the end of the feed movement.

The spindle motors 27 may also be connected for a low speed drive in a reverse direction, respectively by switches 183 and 184, to a low voltage source of current, such as an autotransformer 185 connected to the mains $L_1$, $L_2$ and $L_3$. The motor switches 183 and 184 are normally open, and are movable into closed position respectively by coils 186 and 187 adapted to be connected through normally open relay switches 188 and 189 across the lines 156 and 168. The switches 188 and 189 are under the control of two relay coils 190 and 191 adapted to be connected in parallel across the secondary of a transformer 192 by the commutators 146. These coils also serve when energized to open the switches 159 and 160, when closing the switches 188 and 189 to complete the reverse drive spindle circuits. Thus, the circuit for the coil 190 leads from the transformer 192 through a line 193, the associated commutator 146, a line 194, the coil 190, and a line 195 to the transformer. The circuit for the coil 191 extends in parallel from the line 193, through the associated commutator 146, a line 196, and the coil 191 to the line 195.

Two electric resistance elements, preferably indicating lamps 197 and 198, are connected in parallel to the two commutators 146 respectively across the lines 193 and 194, and 193 and 196. These lamps do not permit the passage of sufficient current to close the switches 188 and 189, but indicate whether or not the transformer 192 is energized for reverse drive of the spindles 5.

The transformer 192 is adapted to be connected by a normally open switch 199 from the main L₁ through a line 200 to the line 168. It is to be understood that the switch 199 will not be closed unless the circuits for the coils 176 and 177 have been disabled as by momentarily opening the switch 179. Suitable mechanical interlocks (not shown) may be provided between the main motor switches 174 and 175, and the switches 183 and 184 to prevent simultaneous closure. The switch 199 is adapted to be closed by a cam 199ª at the end of the feed movement and the start of the return movement.

When the switch 199 is closed, the transformer 192 is energized, and hence current will be supplied to drive the motors 27 unless the spindles 5 are in a predetermined position of rotation. Considering one of the spindles 5 and assuming that it is rotatably disposed 180° from the position indicated in Figs. 4 and 4ª the commutator drum 147 will connect the brushes 150 to close the low resistance circuit for the coil 190, and hence the spindle will rotate slowly in a reverse direction. As soon as the insulation segment 149 breaks the connection, the switch 183 will be caused to open.

The spindle brakes 123 are automatically applied whenever the spindle motors 27 are deenergized. To this end, the brake releasing solenoids 136 are connected respectively in circuits across two supply lines of the motors, and are controlled by normally open switches 201 and 202 operable by coils 203 and 204. These coils are connected in parallel respectively with the coils 176 and 177. Taking one of the spindles 5 as illustrative, when the coils 176 and 203 are energized, current is supplied to the motor 27 through the switch 174, and to the solenoid 136 through the switch 201 to release the brake. Interruption of the motor circuit also serves to interrupt the brake circuit to effect application of the brake.

The coils 203 and 204 are not energized during the reverse drive, and hence the brakes 123 apply a drag to the spindles 5 so as to insure that the spindles will stop immediately upon interruption of the control circuits by the insulating segments 149.

It will be evident from the foregoing that the switches 158, 162, 165, 178, 179 and 199 are operable in response to the carriage movement and that the operation thereof is correlated to the operation of the pilot valves 58 to 62. To this end, the switch actuating cams 158ª, 162ª, 165ª, 178ª, 179ª and 199ª are adjustably mounted in the T-slot 65 on the side of the carriage 19 and the switches operable thereby are mounted in fixed position on the front of the column 4.

In operation, the switch 153 is closed and then the plunger 78 is elevated to institute the rapid approach movement of the carriage 19. Immediately thereafter the cam 178ª closes the switch 178 to institute forward drive of the spindle motors 27. Thereupon, the holding switch 182 is closed to maintain the spindle circuit, and the switch 173 is closed to prepare the shunt holding circuit for the motor 33. When the plunger 82 is depressed to institute the boring feed, the table 7 is moved into operative position, thereby opening the switch 163 and closing the switch 171, and the cam 165ª opens the switch 165. The pilot control circuit for the motor 33, however, is uninterrupted since the circuit will be closed through the switches 171 and 173. Just before the end of the feed movement, the cam 179ª will open the switch 179, thereby interrupting the forward spindle drive and applying the brakes 123. At the end of the feed movement, the cam 165ª will permit the switch 165 to close, the cam 199ª will close the switch 199 to institute the reverse spindle drive with the brakes applied, the dog 81ª will depress the plunger 81 to effect elevation of the plunger 82 and thereby condition the system for rapid traverse, and the dog 80ª will depress the plunger 80 to institute the return movement. The return movement, however, is delayed until the piston 105 moves to connect the lines 107 and 108. During the dwell, the table 7 will be moved into inoperative position, thereby closing the switch 163 and opening the switch 171, and the spindles will stop in the aforesaid predetermined position of rotation. At the start of the return movement after the dwell, the cam 158ª will open the switch 158. The return movement will continue if the reverse spindle drive is interrupted. Shortly after the start of the return movement, the cam 162ª will open the switch 162, but the return movement will continue if the table 7 has been shifted into inoperative position to close the switch 163.

I claim as my invention:

1. In a machine tool, in combination, a base, a carriage reciprocable on said base, a spindle mounted on said carriage, a reversible electric drive for said spindle, a normally applied brake for said spindle, and electric control means for said drive automatically operable to effect rotation of said spindle in one direction with the brake released and at a predetermined point in the carriage movement to reverse the spindle rotation with the brake applied and to interrupt the reverse drive upon movement of said spindle into a predetermined position of rotation.

2. A hydraulic operating mechanism for a reciprocable element of a machine tool comprising, in combination, a base for supporting said element, a hydraulic motor for reciprocating said element, valve means including two pilot valves mounted in fixed position on said base and operable respectively to effect rapid traverse and feed movements of said element, each pilot valve comprising a casing and a valve member movable therein and projecting therefrom, control means on said carriage, each member having an inoperative position and an operative position for engagement with said control means, a pressure fluid supply passage for said valve means, a high pressure low volume pump, a low pressure high volume pump, a reversible pressure selecting valve for connecting one or the other of said pumps to said passage, and two passages cross connecting said casings and controlled by said members for selective connection to said supply passage to automatically return either member into operative position upon movement of the other member into inoperative position by said control means, and to effect adjustment of said pressure selecting valve respectively in opposite directions.

3. A hydraulic operating mechanism for a reciprocable element of a machine tool comprising, in combination, a base for supporting said element, a hydraulic motor for reciprocating said element, valve means including two pilot valves mounted in fixed position on said base and operable respectively to effect rapid traverse and feed movements of said element, each pilot valve comprising a casing and a valve member movable therein and projecting therefrom, control means on said carriage, each member having an inoperative position and an operative position for engagement with said control means, a source of fluid under pressure, two passages cross connecting said casings and controlled by said members for selective connection to said source to automatically return either member into operative position upon movement of the other member into inoperative position by said control means, a support movable on said base transversely of said carriage into and out of operative position, and hydraulic means selectively controlled by said pilot valves for moving said support into operative position upon institution of said carriage feed and into inoperative movement upon institution of said rapid traverse.

4. In a boring machine, a rotary boring spindle, a boring tool projecting laterally at one end of said spindle, a work support, means for procuring relative reciprocatory movement between said support and said spindle parallel to the axis of said spindle, an electric motor connected to drive said spindle, means including a rotary commutator switch with an insulating segment for stopping said motor to stop the rotation of said spindle with said tool projecting in a predetermined direction as determined by the range of said segment, means for procuring relative transverse movement between said spindle and support in a direction such that the spindle axis is displaced from the axis of the bore of the workpiece in a direction opposite the projection of the tool, and means controlling the two last said means operable at the end of the boring operation and before the return stroke whereby the tool passes through the finished bore without contacting the same.

5. A tool spindle positioning device comprising, in combination, a rotary spindle, an electric drive motor connected to rotate said spindle in forward and reverse directions, a shaft supported in axial alinement with said spindle and connected thereto for rotation therewith, a split contact drum concentrically secured to said shaft, an insulating segment extending through approximately 90° inserted between the split edges of said drum, said drum and segment constituting a rotary switch element, two stationary contacts spaced longitudinally of said shaft and in peripheral wiping engagement with said element, said element and said contacts constituting a control switch, and electric control means for said motor including circuits to effect forward rotation of said spindle and circuits including said switch to effect reverse rotation of said spindle, said switch being operable to interrupt said last mentioned circuits upon movement of said segment into engagement with said contacts to stop said spindle in a predetermined position of rotation within the range of said segment.

6. A tool spindle positioning device comprising, in combination, a rotary spindle, an electric drive motor connected to rotate said spindle, a shaft connected to said spindle for rotation therewith, a cylindrical switch element secured to said shaft and comprising a contact segment and an insulating segment, stationary contacts spaced longitudinally of said shaft and in peripheral wiping engagement with said element, said element and said contacts constituting a control switch, a friction brake for said shaft and normally engaged by spring means and adapted to be disengaged by electromagnet means, electric control means for said motor including circuits to effect normal rotation of said spindle and operable to energize said electromagnet means, and circuits including said switch to effect positioning rotation of said spindle and de-energization of said electromagnetic means, said switch being operable to interrupt said last mentioned circuits upon movement of said insulating segment into engagement with said contacts to stop said spindle in a predetermined position of rotation within the range of said insulating segment, and means for placing said respective circuits selectively in control.

7. An hydraulic operating mechanism for two reciprocable elements of a machine tool comprising, in combination, a base for supporting said elements, two hydraulic motors for respectively reciprocating said elements, a source of fluid under a relatively high pressure, a source of fluid under a relatively low pressure, a pressure supply line, a pressure selecting valve for connecting one or the other of said sources to said line, a first direction valve for supplying fluid from said line selectively to opposite ends of one of said motors for one of said elements, a second direction valve for supplying fluid from said line selectively to opposite ends of the other of said motors for the other of said elements, pilot valve means operable to reverse said first valve, and pilot valve means operable to reverse said second valve and simultaneously to alternate the connection of said sources to said line, said pilot valves being selectively operable in response to movement of said one element into different positions of translation.

8. In a machine tool, in combination, a base, a carriage movable on said base, a spindle mounted on said carriage for movement therewith, a normally applied friction brake for said spindle, reversible drive means for rotating said spindle at a relatively high speed in a forward direction and at a relatively low speed in a reverse direction, control means for said drive means and operable to institute the drive in said forward direction and to release said brake, and control means for rendering said first mentioned control means inoperable and being operable to effect said drive in said reverse direction against the resistance of said brake, said last mentioned control means being rendered inoperable so as to effect stopping of said drive in said reverse direction upon rotation of said spindle into a predetermined angular position.

IRA J. SNADER.